March 22, 1932. J. H. ROBERTSON 1,850,158
VARIABLE FRICTION GEARING
Filed Dec. 2, 1929 3 Sheets-Sheet 1

March 22, 1932. J. H. ROBERTSON 1,850,158
VARIABLE FRICTION GEARING
Filed Dec. 2, 1929  3 Sheets-Sheet 3

Patented Mar. 22, 1932

1,850,158

UNITED STATES PATENT OFFICE

JOHN HOGG ROBERTSON, OF LONDON, ENGLAND

VARIABLE FRICTION GEARING

Application filed December 2, 1929, Serial No. 411,095, and in Great Britain December 19, 1928.

This invention relates to variable friction gearing in which a driven member is adapted to make face contact with a driving member, a direct drive position being provided in which the two members engage coaxially in the manner of a disc or cone clutch, and a series of indirect drive positions being provided in which one member is displaced laterally to a variable extent so that contact takes place eccentrically between the conical surfaces of the two members at points (or limited areas) of which the radial distances from the respective axes are unequal.

In my Patent 1,772,593 granted under date of August 12, 1930, I have described a variable friction gearing in which the driving and driven members are controlled automatically in accordance with the speed and/or load, and the laterally displaceable member is also displaceable axially by an independent regulating device, so that the automatic operation of the variable gear can be suppressed or modified to suit particular conditions of operation.

The present invention has for its main object to provide an improved arrangement of the parts in a friction gearing of the above type, and it comprises means whereby the other frictional member with which the laterally displaceable member engages can be displaced axially, not only automatically in accordance with the speed or other function, but also by an independent regulating control, so that the resultant displacement is determined by the combination of the automatic and the independent controls.

The invention has for its especial object the application of the variable friction gearing to small shunting locomotives and the like, in which it is desirable to preclude any creeping of the locomotive when the engine is idling or running slowly, to ensure that the accidental acceleration of the engine from the slow-running speed will not move the locomotive inopportunely, and also to furnish means for regulating the rate of acceleration for varying conditions without altering the normal automatic action of the gearing.

In the preferred arrangement, the driven member of the gearing is displaceable laterally and the other member displaceable axially provides the driving member of the gearing. The axial displacement of said other or driving member is produced automatically in accordance with its speed by means of a suitable governor device. In conjunction therewith, the driving member can be given, for example manually, an independent axial displacement, so as to increase or to decrease the amount of its axial displacement as produced automatically by the governor device, the effect being to vary the range of gear afforded by the automatic control or to separate the friction members sufficiently to prevent their engagement with one another.

The invention is hereafter described with reference to the accompanying drawings, in which.

Figure 1:
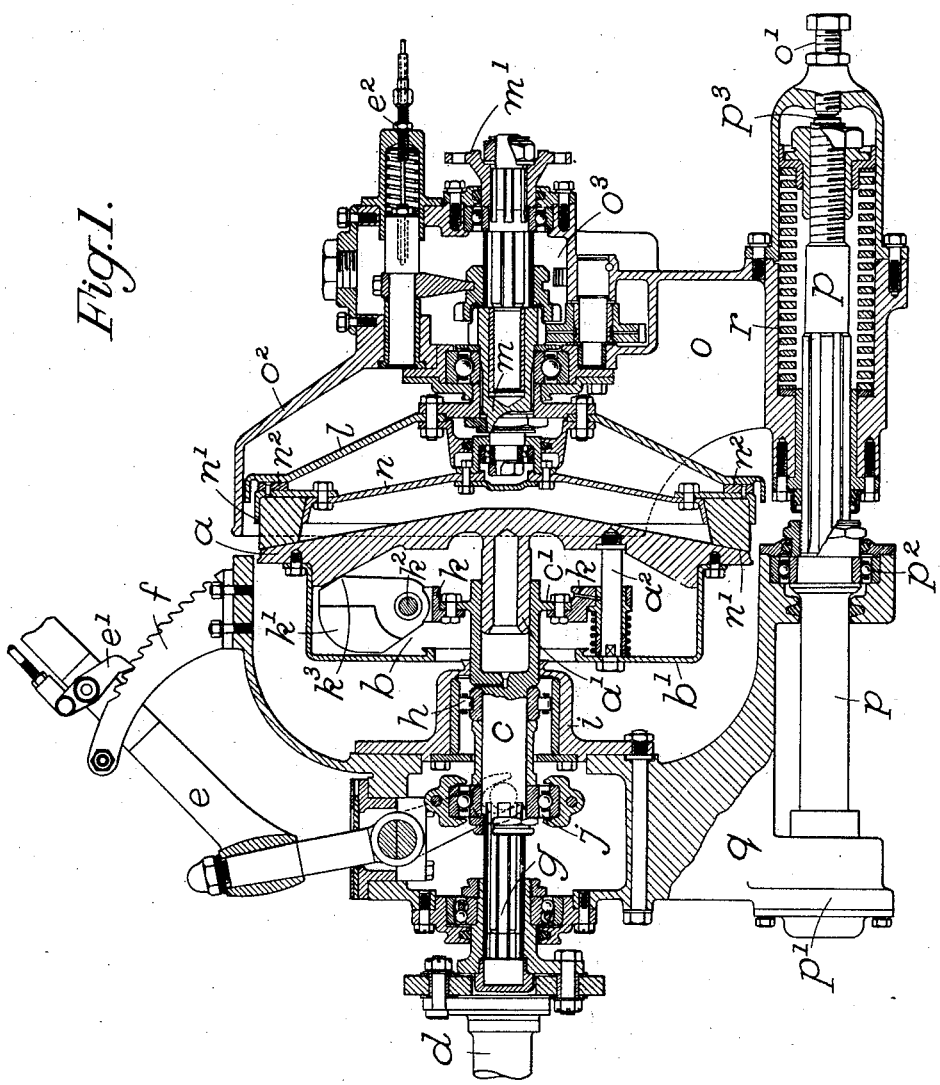
Figure 1 represents in sectional elevation, a variable friction gearing embodying the present improvements.

The driving member $a$ of the friction gearing shown in Figure 1 is mounted together with its governor device $b$, which controls its axial displacement in accordance with the speed, upon an axially slidable shaft $c$ forming a prolongation of the engine shaft or driving shaft $d$, the slidable shaft $c$ being regulated in position by a hand lever $e$ provided with a latch $e^1$ working over a quadrant $f$. The slidable shaft $c$ is connected at one end to the shaft $d$ by a telescopic driving joint, such as a splined connection $g$; its other end, which carries the governor device $b$ and the axially displaceable driving member $a$, is supported by a travelling roller bearing $h$ inside a bell housing $i$ or the like, a thrust bearing collar $j$ upon the slidable shaft $c$ being controlled by the hand lever $e$.

The centrifugal governor weights $k^1$ (of which only one is shown) are pivotally mounted upon spindles $k^2$ carried by a ring $k$ bolted to a flange $c^1$ at the end of the shaft, which is formed as a cylindrical socket in which the hub $a^1$ of the driving disc is slidable. The drive may be transmitted to the disc $a$ by a splined or like connection between the socket and the hub $a^1$, or by means of the studs $a^2$ which slide through bushes in the ring $k$ and carry the cover $b^1$ enclosing the governor device $b$. The back of the disc $a$ is suitably shaped to engage the edges of the governor weights $k^1$ which are formed as cams $k^3$ to produce the desired axial displacement of the disc according to its speed of rotation.

The driven member of the friction gearing comprises a wheel $l$ secured to the shaft $m$, the wheel engaging the driving disc $a$ through the medium of a loose concentric disc $n$ fitted with friction material $n^1$, $n^2$ on its opposite sides. The driven shaft $m$ is supported by a radius arm $o$ which swings upon a spindle $p$ rotatably mounted in bearings $p^1$, $p^2$ upon the frame $q$, the radius arm being adapted to slide along the spindle $p$ until arrested by a stop screw $o^1$ abutting against the end $p^3$ of the spindle by the action of an adjustable spring $r$ serving to limit the pressure between the frictional members when in engagement. The radius arm $o$ also comprises a part-circular housing $o^2$ which covers in the driven member of the friction gearing.

The driven shaft $m$ is fitted with a universal joint connection $m^1$ for transmitting the final drive to a propeller shaft or the like (not shown).

With this arrangement, the driven member $l$ has only to perform its movement of lateral displacement together with such axial displacement as is necessary to maintain its contact with the driving member $a$, but it is not subjected to the supplementary axial displacement due to the independent regulating control exerted by the hand lever, as in my prior application mentioned; consequently a reverse gear or equivalent, if required, can be mounted in direct relation to the driven member, the reverse gear box being shown arranged as at $o^3$ integral with the radius arm $o$ which supports the driven member. The engagement of the reverse gear can be controlled for example by a Bowden cable device $e^2$, operated by a catch (not shown) upon the hand lever $e$, which can thus be conveniently operated for interrupting the friction drive while the reverse is being engaged or disengaged by the same hand. In addition to or instead of the reverse gear mentioned, there might be provided a low gear drive through a reducing train or through a separate gear box, for use in particularly arduous conditions.

Figure 2:
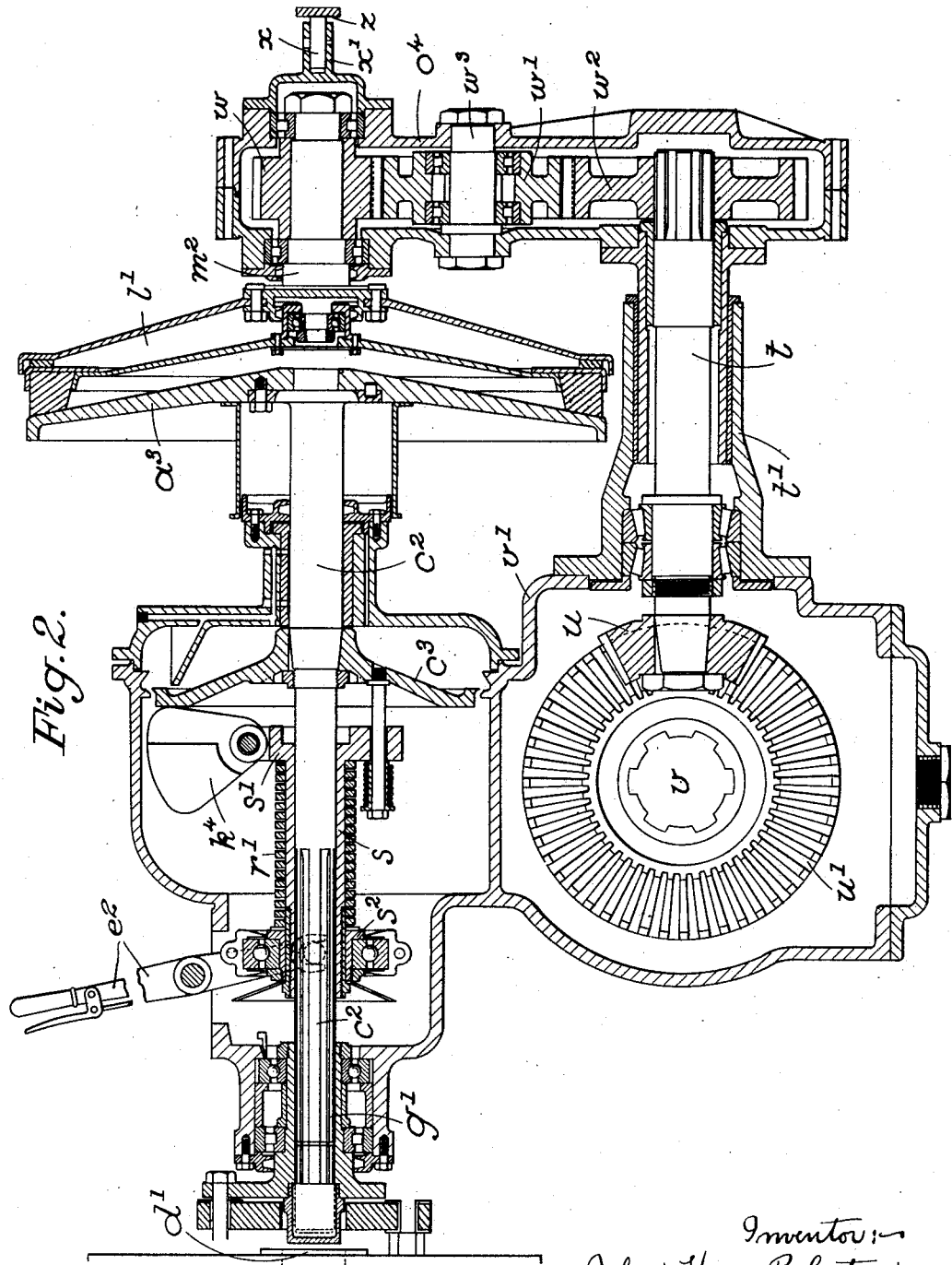
Figure 2 is a similar view of a second form of construction.
Figure 3:
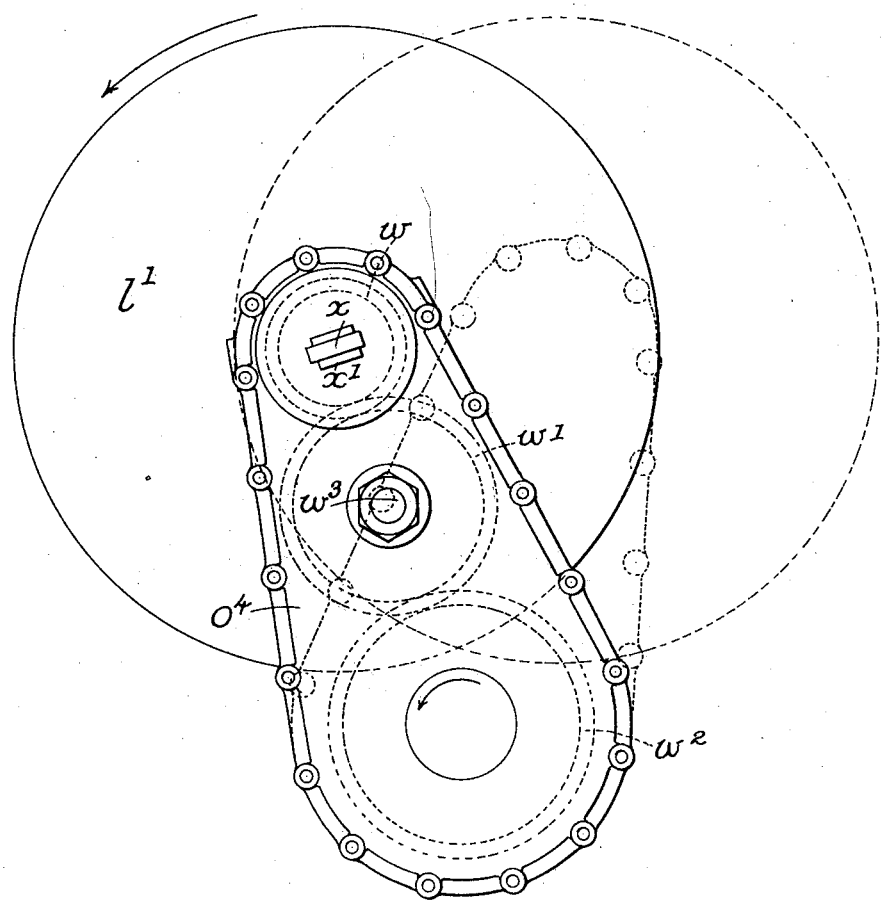
Figure 3 is an end view of Figure 2.

Figures 2 and 3 illustrate another form of construction in which the drive is transmitted through a reducing train enclosed in the radius arm.

In this construction, the driving member $a^3$ of the friction gearing is mounted upon the end of an axially slidable shaft $c^2$ having its other end connected by a telescopic joint $g^1$ to the engine shaft or driving shaft $d^1$. At about the middle of its length, the shaft $c^1$ carries a plate $c^3$ the back of which is suitably shaped to engage the cam-shaped edges of the governor weights $k^4$; the support for the governor weights is in this construction formed as a flange $s^1$ upon a sleeve $s$ surrounding the shaft $c^2$ and slidable along the latter. A hand lever $e^2$ controls a thrust collar $s^2$ mounted upon the other end of the sleeve $s$, a compression spring $r^1$ being fitted around the sleeve $s$ between the flange $s^1$ and the collar $s^2$ which is slidable along the sleeve against the compression of the spring. The operation of the hand lever in one direction will draw back the governor from the plate $c^3$, so that a higher speed of the driving shaft $d^1$ will be required to bring the governor weights $k^4$ up against the plate for starting, or with the same speed of the driving shaft $d^1$ the driving disc $a^3$ will have to move further back in order to bring the plate $c^3$ against the governor weights, thereby giving a lower gear ratio for the friction drive, or even preventing the engagement of the driving and driven members when the lever is in the extreme position.

Conversely, a movement of the hand lever in the opposite direction will act through the spring $r^1$ to advance the governor towards the plate $c^3$, giving a higher gear ratio; if the friction gear is already at the highest ratio or direct-drive position, the spring $r^1$ will take up the movement of the hand lever without shifting the slidable shaft $c^2$, the pressure on the plate $c^3$ and at the friction driving surfaces being increased accordingly.

In this construction the driven member $l^1$ and driven shaft $m^2$ are carried by the upper end of a radius arm $o^4$ which swings about the center of a layshaft $t$; in Figure 3, the full lines indicate the position of the radius arm $o^4$ corresponding to the high gear position, with the friction members in coaxial relation, while the dotted lines indicate the low gear position, with the driven member displaced laterally to the full extent. Since the layshaft $t$ forms the center of the swinging movement of the radius arm, it can transmit the final drive through bevel gears $u$ $u^1$ for example to a final drive shaft or vehicle axle $v$ as shown in Figure 2.

The radius arm $o^4$ is pivotally mounted in a bearing bracket $t^1$ extending from the axle casing $v^1$ and supporting the shaft $t$, so that the radius arm swings concentrically of the latter. The drive from the shaft $m^2$ is communicated to the shaft $t$ by means of gears $w$ $w^1$ $w^2$ enclosed in the radius arm, which constitutes a casing for these gears, of which the intermediate gear $w^1$ runs idly upon a fixed axle $w^3$ while the relative diameters of the two gears $w$ $w^2$ are selected according to the reduction of speed to be effected between the shafts $m^2$ and $t$ to which they are respectively secured.

The upper end of the radius arm is shown provided with a roller $x$ carried by a forked bracket $x^1$ forming a cover over the free end of the shaft $m^2$; this roller $x$ travels upon an arcuate guide rail $z$ fixed upon the frame of the vehicle or the like, so that the end thrust of the friction members is borne by the roller $x$ directly in line with the driven shaft $m^2$.

What I claim is:—

1. In a variable friction gearing, comprising driving and driven members with conical surfaces adapted for frictional driving contact, said members having their axes of rotation substantially parallel, one of said members being displaceable laterally from a position coaxial with the other member to an eccentric position, said other member being displaceable axially to maintain driving contact with said laterally displaceable member, an automatic governor-controlled mechanism for regulating the axial displacement of said other member in accordance with its speed and an independent manual control for the axial displacement of said other member.

2. In a variable friction gearing, comprising driving and driven members with conical surfaces adapted for frictional driving contact, said members having their axes of rotation substantially parallel, said driving member being displaceable axially to maintain contact with said driven member, an automatic governor-controlled mechanism for regulating the axial displacement of said driving member, and said driven member being displaceable laterally from a position coaxial with said driving member to an eccentric position, and means for regulating the axial displacement of said driving member by an independent control superposed upon the automatic control.

3. In a variable friction gearing, comprising driving and driven members with conical surfaces adapted for frictional driving contact, said members having their axes of rotation substantially parallel, said driving member being displaceable axially to maintain contact with said driven member, an automatic governor-controlled mechanism for regulating the axial displacement of said driving member, and said driven member being displaceable laterally from a position coaxial with said driving member to an eccentric position, the combination of a slidable shaft connected for rotary movement to said driving member, said shaft having said governor-controlled mechanism mounted thereon, a thrust-collar mounted upon said slidable shaft, and manual means in connection with said thrust collar for producing axial movement of said slidable shaft.

4. A variable friction gearing, comprising driving and driven members with conical surfaces adapted for frictional driving contact, said members having their axes of rotation substantially parallel, a radius arm supporting one of said members for lateral displacement to a position eccentric of the other member, an axially slidable shaft connected for rotary movement to said other member, a governor mechanism mounted upon said shaft, said governor mechanism adapted to produce axial displacement of said other member in accordance with the speed of said shaft, and independent means for regulating the position of said slidable shaft.

5. A variable friction gearing, comprising driving and driven members with conical surfaces adapted for frictional driving contact, said members having their axes of rotation substantially parallel, a radius arm supporting said driven member for lateral displacement to a position eccentric of said driving member, a driving shaft, an axially slidable shaft connecting said driving shaft to said driving member, said driving member being displaceable axially in relation to said slidable shaft, automatic means for controlling the displacement of said driving member in relation to said slidable shaft, and independent means for regulating the position of said slidable shaft.

6. A variable friction gearing, comprising driving and driven members with conical surfaces adapted for frictional driving contact, a radius arm supporting said driven member for lateral displacement to a position eccentric of said driving member, a driving shaft, an axially slidable shaft connecting said driving shaft to said driving member, a frame, means for supporting said slidable shaft in said frame, a spindle mounted in said frame and carrying said radius arm, a governor mechanism mounted upon said slidable shaft and controlling automatically the axial displacement of said driving member in relation thereto, and independent controlling means arranged upon said frame for producing axial displacement of said slidable shaft and said governor mechanism, whereby said driving member receives a resultant axial displacement due to the combination of the automatic and the independent controls.

7. A variable friction gearing, comprising driving and driven members with conical surfaces adapted for frictional driving contact, said members having their axes of rotation substantially parallel, a radius arm supporting said driven member for lateral displacement to a position eccentric of said driving member, a driving shaft, an axially slidable shaft connecting said driving shaft to said driving member, said driving member being displaceable axially in relation to said slidable shaft, automatic means for controlling the displacement of said driving member in relation to said slidable shaft, a driven shaft journaled in said radius arm, a supplementary gear box embodied in said radius arm for transmitting power from said driven member to said driven shaft, and manual means for controlling the position of said slidable shaft whereby said driving member receives a resultant axial displacement due to the combination of the automatic and the manual controls while said driven member, said driven shaft and said gear box move laterally with said radius arm.

8. A variable friction gearing, comprising driving and driven members with conical surfaces adapted for frictional driving contact, a radius arm supporting said driven member for lateral displacement to a position eccentric of said driving member, a driving shaft, an axially slidable shaft connecting said driving shaft to said driving member, a frame, means for supporting said slidable shaft in said frame, a spindle mounted in said frame and carrying said radius arm, a governor mechanism mounted upon said slidable shaft and controlling automatically the axial displacement of said driving member in relation thereto, manual controlling means for producing axial displacement of said slidable shaft and said governor mechanism, and spring means opposing the movement of said manual controlling means towards increased axial displacement of said driving member and limiting the advance of said driving member in relation to said driven member.

In testimony whereof I have affixed my signature.

JOHN HOGG ROBERTSON.